United States Patent [19]

Barrs

[11] Patent Number: 5,142,209
[45] Date of Patent: Aug. 25, 1992

[54] AUTOMATIC REPOSITIONING OF MIRRORS MOUNTED WITHIN CONCAVE-SHAPED BOUNDARIES

[75] Inventor: John A. Barrs, Clawson, Mich.

[73] Assignee: United Technologies Corporation, Hartford, Conn.

[21] Appl. No.: 739,533

[22] Filed: Aug. 2, 1991

[51] Int. Cl.⁵ .............................................. G05B 19/19
[52] U.S. Cl. .................................... 318/265; 318/467; 318/470; 318/560; 307/10.1
[58] Field of Search ............... 318/652, 663, 264, 265, 318/266, 267, 467, 468, 470, 560, 569, 575; 388/907.5; 307/9.1, 10.1

[56] References Cited

U.S. PATENT DOCUMENTS

| | | | |
|---|---|---|---|
| 4,267,494 | 5/1981 | Matsuoka et al. | 318/568.1 |
| 4,540,252 | 9/1985 | Hayashi et al. | 359/874 |
| 4,682,088 | 7/1987 | Sullivan | 318/568 |
| 4,929,878 | 5/1990 | Hansen | 318/560 |

Primary Examiner—Bentsu Ro

[57] ABSTRACT

A memory mirror system having a mirror 19 mounted within concave-shaped mirror movement boundaries, two constant speed motors 16, 18 each controlling an axis of mirror movement, position feedback signals 26,28 from each motor, push button inputs 12 and an electronic controller 10, is provided with automatic mirror repositioning that drives the mirror from a start position to a memory position in minimum time without colliding with any mirror movement boundaries by driving the mirror position toward the target along the axis farthest from the target and driving the mirror toward the origin along the other axis until the mirror position is within a predetermined safe region along that axis or the current position is 45 degrees from the target, then driving the mirror in the direction of the target along an axis for which the distance to the target is not less than the distance to the target along the other axis or in which the direction toward the target is also toward the origin.

2 Claims, 3 Drawing Sheets

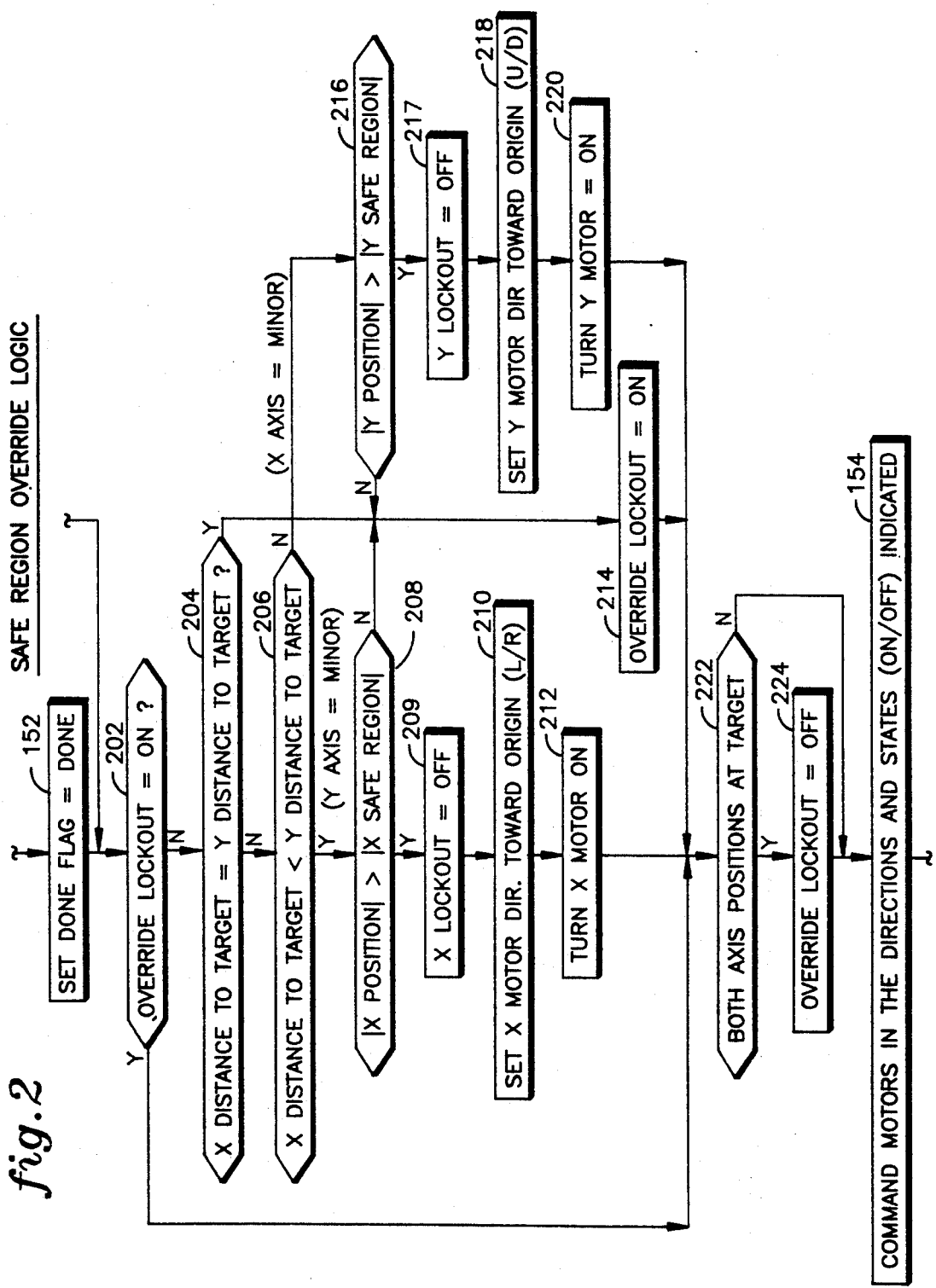

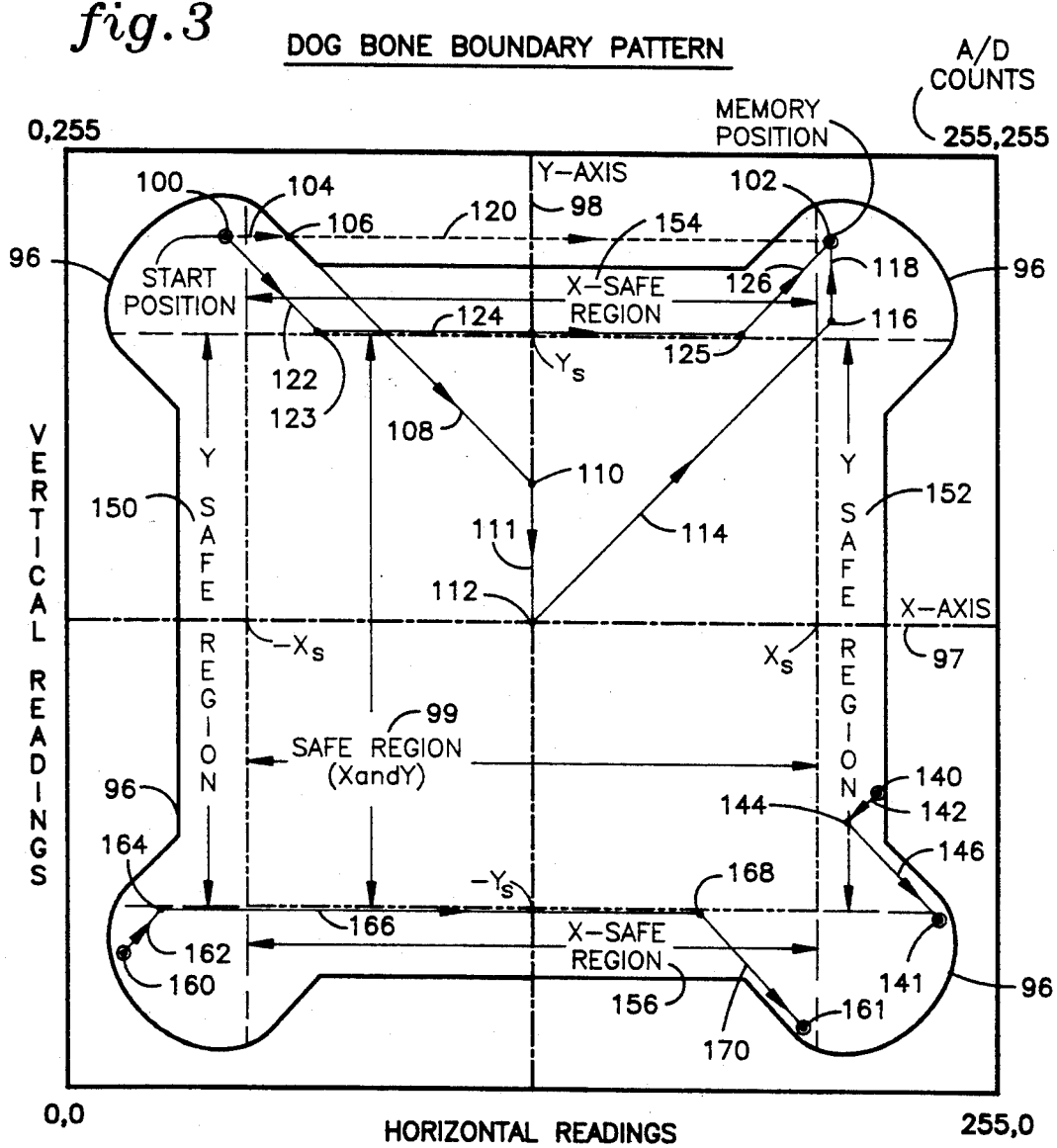

AUTOMATIC REPOSITIONING OF MIRRORS MOUNTED WITHIN CONCAVE-SHAPED BOUNDARIES

TECHNICAL FIELD

This invention relates to automatic repositioning (memory) mirrors and more particularly to an improved technique for driving a mirror mounted within concave shaped boundaries from a present position to a previous (stored) position.

BACKGROUND ART

It has become common practice to fit certain vehicles with one or more "memory" mirrors, i.e., a mirror for which one or more desired positions are encoded (stored) in memory and then "remembered" (retrieved from memory). Memory mirrors provide automatic repositioning of a vehicle mirror when the mirror has been moved out of its desired position. For example, a first driver sets a desired position for a mirror and stores the setting, and later, a second driver manually changes the mirror position. When the first driver returns and initiates a switch closure, the mirror automatically returns to its original (memory) position.

Typically, memory mirror systems comprise known electronic hardware, e.g., two motors, one for up/down mirror movement about a "horizontal" axis and another for left/right mirror movement about a "vertical" axis, each motor having analog voltage position feedback, driven by an electronic controller comprising: a 4-bit micro-controller with "on chip" memory, motor drivers, and analog-to-digital (A/D) converters, such as that described in U.S. Pat. No. 4,929,878.

Mirror movement is typically achieved by mounting a mirror to a support shaft using a fixed position ball joint, at the center of the mirror, thereby allowing mirror movement in all directions, and pushing/pulling an off-center point on the mirror using a motor connected to the mirror by a rack-and-pinion arrangement. The rack-and-pinion converts clockwise or counter-clockwise (CW/CCW) rotational motion of the motor output shaft into translational motion of a rod (or rack) using a gear mounted to the motor output shaft. The rod has notches which mesh with the gear and allow the rod to be driven thereby. For example, for left/right mirror movement, a first motor drives a first rod having one end attached to the mirror at a point along a horizontal line, a known distance to the right or left of the center of the mirror. For up/down mirror movement, a second motor drives a second rod having one end attached to the mirror at a point along a vertical line (perpendicular to the horizontal line), a known distance above or below the center of the mirror. The position of the mirror is typically described by two coordinates, one for the position of each rod. Position sensing of each rod (i.e., position feedback) is provided by a potentiometer, having a wiper shaft geared to the motor output shaft, which provides a variable voltage to the electronic controller.

The motors are typically bidirectional (CW or CCW), DC, constant speed motors, and are operated either individually or together, having equal speeds when turned ON. When a motor is turned ON it may be run either CW or CCW, which translates into left/right mirror movement by one motor and up/down mirror movement by the other motor (as described hereinbefore). Thus, the mirror has eight paths of motion: up, down, right, left, up left 45°, up right 45°, down left 45°, down right 45°.

A memory mirror system includes an algorithm for driving the mirror from a starting position to a previously stored "memory" or target position. Previous algorithms, e.g., the algorithm described in the aforementioned patent (referred to hereinafter as the prior art algorithm), start with both motors running (i.e., motion at a 45° angle from the present position). Viewing the starting mirror position as the origin (center) of an orthogonal coordinate system, the prior art algorithm first drives the mirror at 45° in the quadrant where the destination is located until the mirror position is along either a horizontal or vertical line from the destination, then turns OFF the appropriate motor allowing the remaining running motor to bring the mirror to the desired target position.

Memory mirrors are typically mounted within a cavity or housing that provides a limited amount of mirror movement. If the mirror hits a boundary (also known as a stop or obstruction) the mirror travel stops. The mirror movement boundaries are typically a known convex shape having no concave edges, such as a circle, an oval, or a parallelogram. However, the shape of the boundaries may also be more complex, having concave edges, such as a "dog bone" pattern, i.e., a square with corners which are rounded and bulge outward away from the center. The shape of the boundaries is determined by the shape of a power pack, which houses the motors and potentiometers, and the distance from the power pack to the mirror (determined by the length of the mirror's supporting shaft). The mirror is typically a known shape such as a circle, an oval, a half oval, or a parallelogram but is not necessarily the same shape as the boundaries it is mounted within. Using existing mirror positioning algorithms, it is possible to hit a boundary, e.g., when a concave boundary lies between the starting and ending points, thereby requiring the algorithm to detect when a boundary is hit. Boundary detection is typically done by calculating the rate of change of motor speed with time and comparing it to a known predetermined value, e.g., 0 degrees/second. Furthermore, once a boundary is hit, the mirror is typically driven to the origin (0,0) of the mirror movement area using the same positioning algorithm and, once at the origin, a second attempt is made to drive the mirror to the desired position. Driving to the origin increases the time for the mirror to reach the "memory" position by approximately 2 to 3 seconds, and detecting boundary collisions requires additional complexity of the repositioning algorithm which translates into increased memory space and slower execution time.

DISCLOSURE OF THE INVENTION

Objects of the invention include provision of automatic repositioning of a mirror mounted within concave-shaped mirror movement boundaries (stops) which avoids hitting such boundaries, which imposes no increase in travel time for avoiding such boundaries, which provides the fastest possible travel time between two points having a boundary therebetween, with two constant speed motors, and which minimizes the software required.

According to the present invention, a first motor drives the mirror toward the target position along a first axis having a distance to the target not less than the distance along a second axis, and a second motor drives the mirror toward the origin along the second axis (minor axis) until either the mirror position is within a predetermined safe region along the second axis or the distances to the target along both axes are substantially equal; then the second motor drives the mirror toward the target if the distance to the target along the second axis is not less than the distance to the target along the first axis; otherwise, the second motor is OFF. According further to the invention, after either the mirror position is within the predetermined safe region along the second axis or the distances to the target along both axes are substantially equal, the second motor drives the mirror toward the target if the direction toward the target along the second axis is also toward the origin.

The present invention employs a safe region override algorithm that may work in conjunction with copending U.S. patent application, Ser. No. 716045 entitled "Automatic Mirror Repositioning" (referred to hereinafter as the primary algorithm), and minimizes software changes to the first algorithm, by first allowing the primary algorithm to set the directions and states (ON/OFF) of the motors and then, if the start position is outside a predetermined safe region along the axis having the shortest distance to the target (i.e., the minor axis), the safe region override algorithm turns ON the motor controlling such axis, in the direction toward the origin, thereby overriding the primary algorithm for that motor only. When either the minor axis position is within the safe region boundaries, or the distances to the target are the same along both axes, the safe region override routine is disabled and the primary algorithm drives the mirror to the target position. If the start position is within the predetermined safe region along the minor axis, the safe region override algorithm is not invoked and the primary algorithm drives the motor to the target position.

The invention represents a significant improvement over previous techniques by avoiding concave-shaped mirror movement boundaries and still providing the fastest mirror travel time possible using two constant speed motors, independent of the starting mirror position. The invention provides optimal travel time around boundaries by driving the mirror to a default position that imposes no greater travel time than if the boundary did not exist, rather than driving to the origin. This technique simplifies existing logic by not requiring the detection of boundary collisions, thereby saving memory space, which allows lower cost micro-controllers with on-chip memories to be used. Smaller and simpler logic yields faster execution time, thereby allowing a faster update rate and, thus, quicker control response time. Also, the invention provides concave mirror movement boundary avoidance without requiring the algorithm to know the shape of the boundary. The invention also provides logic to avoid fighting between the primary algorithm and the safe region override algorithm caused by mismatches in motor speeds or electronic noise on the position feedback signals.

The foregoing and other objects, features, and advantages of the present invention will become more apparent in light of the following detailed description of exemplary embodiments thereof, as illustrated in the accompanying drawings.

BRIEF DESCRIPTION OF THE DRAWINGS

FIG. 2 is a logic flow diagram illustrating steps of an algorithm in accordance with the present invention.

FIG. 3 is a diagram illustrating the mirror movement boundaries and movement paths under a prior art algorithm when it encounters a concave mirror movement boundary and, in accordance with the present invention, showing boundary avoidance, for a mirror having a dog bone boundary configuration.

BEST MODE FOR CARRYING OUT THE INVENTION

Figure 1:
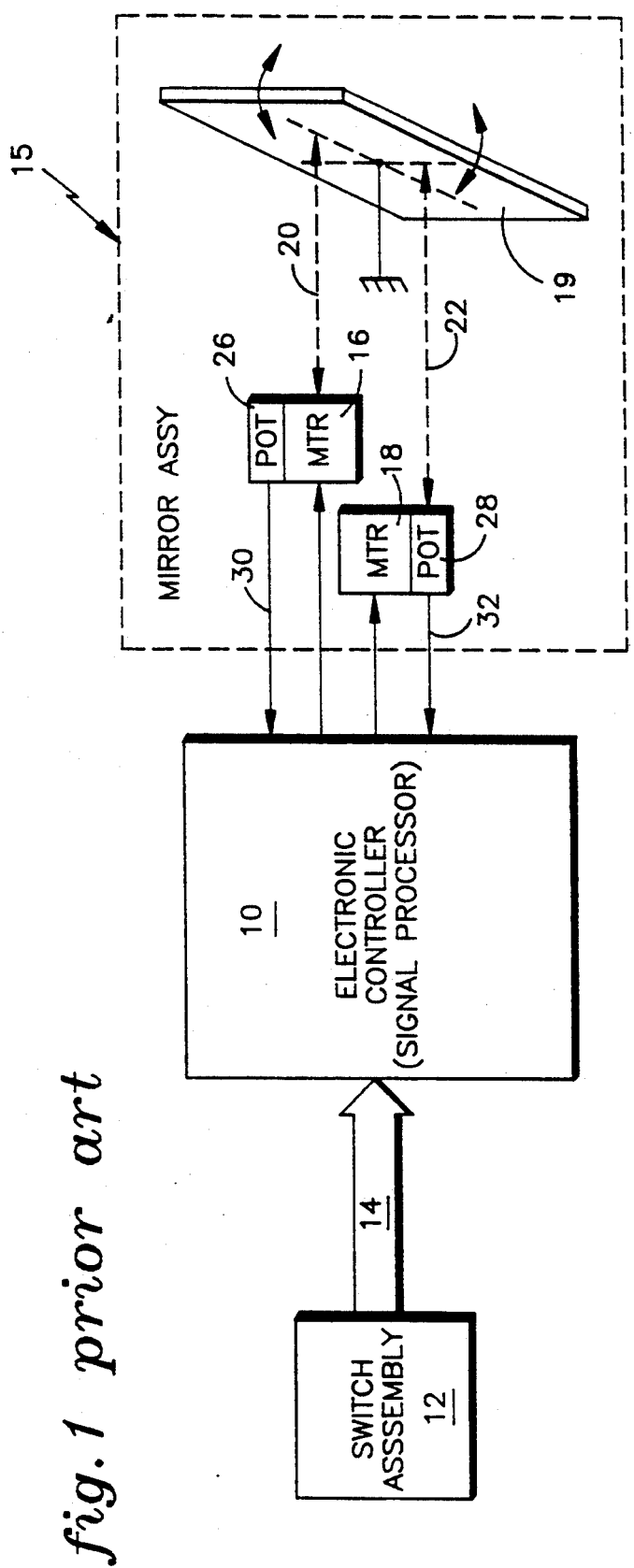
FIG. 1 is a schematic block diagram of a prior art hardware configuration in which the present invention may be applied.

Referring to FIG. 1, the prior art hardware configuration for a typical automatic mirror repositioning ("memory" mirror) system, such as that described in the aforementioned Patent typically comprises an electronic controller (or signal processor) 10, comprising the aforementioned known components, which accepts inputs from a switch assembly 12 comprising a plurality of switches, i.e., a set push-button, two memory push-buttons, a left/right/neutral toggle switch and a joy stick or a four push-button pad on the lines 14.

The signal processor 10 provides output signals to and accepts input (feedback) signals from a mirror assembly 15. The signal processor 10 typically drives two motors, 16,18 which control a mirror 19 in a known way. For example, a first motor 18 controls left/right (horizontal) mirror movement and a second motor 16 controls up/down (vertical) mirror movement. Each motor is mechanically linked by known means 20,22, e.g., a rack and pinion arrangement, to the mirror 19.

Each motor output shaft is geared to a position sensing device 26,28 which provides an analog feedback voltage signal on lines 30,32 respectively to the signal processor 10, e.g., 0 to 5 volts corresponds to min. to max mirror position for a given direction. The signal processor 10 converts each analog feedback voltage signal to a series of digital bits using an eight bit analog to digital (A/D) converter, i.e., 0 to 255 A/D counts corresponds to 0 to 5 volts from the feedback sensors. One position sensor provides a vertical position signal and the other provides a horizontal position signal. The granularity (resolution) of the motor position feedback is within 1 bit of the A/D converter.

The two readings from the position sensors make up two coordinates for the position of the mirror. The position feedback A/D counts may be viewed as an orthogonal coordinate system having an x-axis and a y-axis and having as its origin (0,0), the equivalent of the A/D counts (128,128), i.e., half the scale of each motor's full range of travel. For example, if horizontal mirror movement (left/right) is considered the x-axis and vertical mirror movement (up/down) is considered the y-axis, a reading of 150 A/D counts from the horizontal motor and 200 A/D counts from the vertical motor, would correspond to coordinates of: x=22, y=72.

The invention uses a positioning algorithm that combines the primary algorithm, as described in FIG. 2 of the aforementioned patent application, with a safe region override routine (FIG. 2 herein) to provide concave mirror boundary avoidance.

To avoid concave mirror movement boundaries, a predetermined safe region (X and Y) must first be established encompassing all the required concave boundary shapes and described by a set of x-axis and y-axis safe region coordinates (Xs,Ys). The safe region comprises a set of boundary positions within which any other position in the movement boundary may be reached using the primary algorithm.

Referring to FIG. 2, the safe region override routine of the invention is performed as part of the primary algorithm just prior to commanding the outputs to the motors (primary algorithm, FIG. 2 of aforementioned patent application, step 154). A test 202 determines if the Override Lockout flag is set to the ON state. If not, a test 204 determines if the X-distance to the target is equal to the Y-distance to the target. If the distances are not equal, a test 206 determines which axis has the shortest distance to the target. If the X-distance to the target is less than the Y-distance to the target, the x-axis is the "minor" axis and a test 208 determines if the absolute value of the x-axis position feedback is greater than the absolute value of the x-axis coordinate (Xs) for the safe region, i.e., it determines if the minor axis is outside the safe region for that axis. If it is, a series of steps 209-212 overrides the primary algorithm settings for the X-motor. A step 209 resets the X-lockout flag to the OFF state. This is done to preclude the X-motor from being locked out prematurely by the primary algorithm when the X-distance equals 0 and the x-axis position is outside the safe region along the x-axis, thereby allowing the primary algorithm to drive the mirror to the target position when the safe region override routine is finished. Then a step 210 sets the direction of the X-motor to drive the mirror toward the origin (L/R), which is also toward the safe region. Then a step 212 sets a flag to turn the X-motor ON. If the test 208 determines that the minor axis is within the safe region the steps 209-212 are bypassed and a step 214 sets the Override Lockout flag to the ON state which locks out the primary algorithm override functions of the safe region override routine.

If the test 206 determines that the X-distance to the target is not less than the Y-distance to the target, the y-axis is the "minor" axis and similar logic is performed for the y-axis as was performed for the x-axis. A test 216 determines if the absolute value of the y-axis position feedback is greater than the absolute value of the y-axis coordinate (Ys) for the safe region. If it is, a series of steps 217-220 overrides the primary algorithm settings for the y-axis motor. A step 217 resets the Y-lockout flag to the OFF state. This is done to preclude the Y-motor from being locked out prematurely by the primary algorithm. Then a step 218 sets the direction of the X-motor to drive the mirror toward the origin (U/D). Then a step 220 sets a flag to turn the Y-motor ON. If the test 216 determines that the minor axis is within the safe region, the steps 217-220 are bypassed and step 214 sets the Override Lockout flag to the ON state which locks out the primary algorithm override functions of the safe region override routine.

If the test 202 determines that the Override Lockout flag is set to the ON state, or after executing the steps 212, 214, or 220, a test 222 determines if both axis positions are at the target. If they are, a step 224 resets the Override Lockout flag to allow the safe region override routine to execute the next time the primary algorithm is initiated, and the primary routine resumes at the step 154 point 226. If both axes are not at the target, the step 224 is bypassed and the primary routine resumes and the step 154 commands the motors in the directions and states (ON/OFF) indicated. It should be understood that many iterations of the safe region override routine may likely occur with no override required because the mirror position is within the safe region.

As discussed hereinbefore, typically a driver presses the "memory" push-button to automatically reposition the mirror from its current position to a previously stored memory position. The signal processor, as is known, monitors the memory push-button discrete input signal and, when it is depressed, initiates the primary algorithm at a known real-time invocation rate, e.g., 3.125 milliseconds, which also executes the safe region override at the same rate. The signal processor also monitors the DONE flag in the primary algorithm and, when it is set to the DONE state, the mirror has reached the memory position and the repositioning routine is no longer called until the memory push-button is again depressed.

Referring now to FIG. 3, a mirror with a dog bone boundary pattern 96, superimposed on an x-axis 97 and a y-axis 98 and having a safe region 99, is shown with a start position 100 and a target position 102. The prior art algorithm of the aforementioned patent drives the mirror along the horizontal path 104 because the target position 102 is solely along the x-axis from the starting position. The mirror is driven along a path 104 until it hits the mirror movement boundary 96 at a point 106. When the boundary collision is detected, the mirror is driven along a path 108 (at a 45° angle) to a point 110 and then driven vertically down along a path 111 to bring the mirror to the origin 112 (0,0). Whenever a boundary is hit, the logic sets the origin 112 as a temporary target position (temporarily replacing the "memory" position 102). Once the origin 112 is reached, the logic re-loads the "memory" position 102 as its target and, because the point 102 is in the upper right quadrant of an orthogonal coordinate system having its origin at the origin (0,0), it turns ON both motors and drives the mirror position along a path 114 to a position 116 that is solely along the y-axis 98 direction (i.e., a vertical line) from the target position 102. The logic then turns OFF the X-motor and allows the Y-motor to drive the mirror position along a path 118 to the memory position 102.

Without the constraint of the boundary 96, starting at the point 100, the prior art algorithm would command solely the X-motor ON, driving the mirror position from the point 100 along the path 104 and a path 120 to the memory position 102.

Again starting at the point 100, the algorithm of the invention drives the mirror position from the point 100 along a path 122, moving the mirror at a 45 degree angle toward the safe region 99. This occurs because the X-motor is turned ON in the direction (R) toward the target by the primary algorithm (because the x-axis distance to the target is not less than the y-axis distance to the target, i.e., the x-axis is the major axis) and the Y-motor is turned ON in the direction toward the safe region 99 because the y-axis (minor axis) position is outside the y-axis coordinate (Ys) of the safe region. The mirror is driven at 45 degrees until a point 123 where the minor axis position is less than or equal to the y-axis (minor axis) coordinate (Ys, FIG. 2, test 216). Once the minor axis is within the safe region 99, the Override Lockout flag is set to the ON state, thereby preventing the safe region override routine from controlling the motors for the remainder of the travel to the target, and the primary algorithm drives the mirror to the target along paths 124,126. The primary algorithm turns ON the X-motor in the direction (R) toward the target because the X-distance to the target is not less than the Y-distance to the target and turns OFF the Y-motor because the direction to the target (UP) is not toward the origin. When a point 125 is reached, the X-distance to the target is the same as the Y-distance to the target and the primary algorithm turns ON both motors in the direction of the target, thereby making the mirror follow the path 126 to the target 102.

For a start position 140 and a target position 141, the primary algorithm turns ON the Y-motor (major axis) to drive the mirror toward the target 141 and the safe region override routine (steps 210,212) turns ON the X-motor (minor axis) to drive the mirror toward the safe region 99. The mirror will travel at 45 degrees until a point 144 is reached, where the distances to the target are the same along both axes. At the point 144 the result of the test 204 is affirmative and the Override Lockout flag is set to the ON state by the step 214, thereby allowing the primary algorithm to drive the mirror to the target at 45 degrees along a path 146. Here, the x-axis position did not reach the x-coordinate (Xs) of the safe region 99 because, when the target can be reached at a 45 degree angle, there is no chance of hitting a boundary. Also, to provide optimal travel time, when the target can be reached by a 45 degree angle, the motors must be commanded to do so. It should be understood that the boundaries must have a concavity no steeper than 45 degrees.

Requiring the mirror position to be within the safe region 99 coordinate for only the minor axis, means the mirror position does not need to enter the safe region 99 where both x-axis and y-axis are safe, but only need enter a Y-safe region 150,152 or an X-safe region 154,156, outside the safe region 99. The two safe regions 150,152 are used when the y-axis is the minor axis, and two safe regions 154,156 are used when the x-axis is the minor axis. For example, for a start position 160 and a target position 161, the primary algorithm turns ON the X-motor (major axis) to drive the mirror toward the target 161 and the safe region override routine (steps 210,212) turns ON the X-motor (minor axis) to drive the mirror toward the safe region 99 along a path 162. The mirror travels at 45 degrees along the path 162 until a point 164 is reached, where the y-axis position is within the y-axis coordinate (Ys) for the safe region 99, i.e., within the Y-safe region 150. The mirror will then travel along the path 166 to a point 168 and along the path 170, similar to the aforementioned example path 122,124,126.

It should be understood that if only the dog bone mirror movement pattern shown in FIG. 3 is used by itself (i.e., if the software need not be designed to provide for other mirror movement shapes), the X and Y safe region 99 may be defined out to the vertical and horizontal edges of the dog bone pattern. Also, although the invention has been illustrated as being used on a dog bone pattern, it should be understood that other patterns having numerous different concave surfaces may be used.

The Override Lockout flag is used to avoid fighting between the primary algorithm and the safe region override algorithm caused by mismatches in motor speeds or electronic noise on the position feedback signals. The safe region override will become locked out the first time the X-distance is equal to the Y-distance (test 204) or the first time the minor axis position is less than or equal to the corresponding safe region coordinate (tests 208,216). It avoids requiring the motor feedback counts to track exactly for each update of the safe region override logic. This prevents the safe region override routine from reversing the direction of the minor axis motor when the mirror is outside the safe region and is traveling at 45 degrees toward the target position. If noise or motor speed mismatch is not a concern, the associated steps 214,224 and tests 202,222 dealing with the Override Lockout flag need not be included. It should be understood that this problem does not occur in the primary algorithm because, even though the positions are monitored every update along the 45 degree travel, if a mismatch occurred it would be self-correcting because the travel direction for both axes is toward the target.

Furthermore, it should be understood that the time it takes to travel the paths 122,124,126 is the same as the time to travel the paths 104,120 from the start position 100 to the target position 102 (i.e., the X-motor is ON for the same length of time for either path). This occurs because the mirror velocity at 45 degrees is faster than the velocity along only one axis. When traveling at 45 degrees, the velocity of the mirror is the vector sum of the velocities of each individual axis, i.e., the square root of the sum of the squares of the two axis velocities. Thus, the speed gained by traveling along the paths 122 and 126 exactly offsets the additional distance traveled, thereby imposing no speed penalty for avoiding the concave boundary. In the limit, the paths 122 and 126 need not be joined by the path 124, i.e., the mirror may be driven at 45 degrees toward the safe region until intersecting with a 45 degree angle from the target and then driving to the target at 45 degrees (from either inside or outside the safe region).

Although the invention has been described as driving only one mirror, it should be understood that the invention may be used to automatically reposition as many mirrors as the hardware can support. The primary constraints are the number of motors capable of being driven, the number of inputs to the A/D converter, and the speed of the micro-controller.

Furthermore, although the safe region override has been described as a single routine combined with the primary algorithm, the safe region override routine may be also designed as a subroutine called from the primary algorithm.

Instead of using a safe region defined by only one x-axis coordinate and one y-axis coordinate, other relationships and/or more than one coordinate for describing the safe region along each axis may be used. However, it should be understood that this may increase the amount of logic required to determine if the mirror is within the safe region along the minor axis.

Also, instead of using a rack-and-pinion arrangement to connect the motor to the mirror, any other driving mechanism may be used. Furthermore, although the movement axes are described as being orthogonal, the invention will work equally well with non-orthogonal axes because the position feedback signals will always reflect the current mirror position. Still further, instead of using a potentiometer geared to the output shaft of the motor as the mirror position feedback sensor, any feedback device for measuring the position of the mirror that is related to a given motor's axis of movement may be used.

If motors having different speeds are used, the ratio of the distances (x-axis vs. y-axis) could be performed to accommodate the speed difference. Then, in a sense, the last step of the claimed algorithm would be to drive both motors toward the target when the time to reach the target position with both motors running is substantially equal to the time to reach the target solely along the major axis.

Although the invention has been described and illustrated with respect to exemplary embodiments thereof, it should be understood by those skilled in the art that the foregoing and various other changes, omissions and additions may be made without departing from the spirit and the scope of the invention.

I claim:

1. An automatic mirror repositioning system having at least one mirror mounted within mirror movement boundaries, there being an origin at the center of mirror movement, comprising:
    a first motor, connected to the mirror, controlling mirror movement along a first axis;
    a second motor, connected to the mirror, controlling mirror movement along a second axis;
    a first position means, responsive to the position of the mirror along said first axis, for providing a first feedback signal indicative of a current position of the mirror along said first axis;
    a second position means, responsive to the position of the mirror along said second axis, for providing a second feedback signal indicative of a current position of the mirror along said second axis; and
    signal processing means, responsive to said first and said second feedback signals, for providing signals indicative of a predetermined target position of the mirror and a predetermined safe region along each axis, for causing said first motor to drive the mirror toward said predetermined target position, said first axis having a distance to the target not less than the distance along said second axis, and for causing said second motor to drive the mirror toward the origin along said second axis until either the mirror position along said second axis is within said predetermined safe region along said second axis or the distances to said predetermined target position along both said first axis and said second axis are substantially equal, then causing said second motor to drive the mirror toward said predetermined target position when the distance to said predetermined target position along said second axis is not less than the distance to said predetermined target position along said first axis.

2. The apparatus of claim 1 wherein said signal processing means comprises means for causing said second motor to drive the mirror toward said predetermined target position after either the mirror position along said second axis is within said predetermined safe region along said second axis or the distances to said predetermined target position along both said first axis and said second axis are substantially equal, and when the direction toward said predetermined target position along said second axis is also toward said origin.

* * * * *

UNITED STATES PATENT AND TRADEMARK OFFICE
CERTIFICATE OF CORRECTION

PATENT NO. : 5,142,209
DATED : August 25, 1992
INVENTOR(S) : JOHN A. BARRS It is certified that error appears in the above-identified patent and that said Letters Patent is hereby corrected as shown below:

On the title page, item [73] should read -- United Technologies Automotive, Inc.--

Signed and Sealed this

Twenty-fifth Day of October, 1994

Attest:

BRUCE LEHMAN

*Attesting Officer*  *Commissioner of Patents and Trademarks*